United States Patent [19]

Tai

[11] Patent Number: 5,477,335
[45] Date of Patent: Dec. 19, 1995

[54] METHOD AND APPARATUS OF COPYING OF BLACK TEXT ON DOCUMENTS USING A COLOR SCANNER

[75] Inventor: Hwai T. Tai, Greece, N.Y.

[73] Assignee: Eastman Kodak Company, Rochester, N.Y.

[21] Appl. No.: 996,995

[22] Filed: Dec. 28, 1992

[51] Int. Cl.$^6$ .............................. H04N 1/40; H04N 1/46; G03F 3/08; G06K 9/40
[52] U.S. Cl. .................... 358/298; 358/461; 358/529; 358/532; 382/167
[58] Field of Search ................................. 358/298, 455, 358/456, 461, 462, 464, 465, 466, 513, 529, 530, 532, 534; 382/27, 41, 54

[56] References Cited

U.S. PATENT DOCUMENTS

| | | | |
|---|---|---|---|
| 4,554,593 | 11/1985 | Fox et al. | 382/54 X |
| 4,853,970 | 8/1989 | Ott et al. | 382/54 |
| 4,862,283 | 8/1989 | Smith | 358/443 |
| 4,958,219 | 9/1990 | Kadowaki | 358/75 |
| 5,032,903 | 7/1991 | Suzuki et al. | 358/75 |
| 5,047,844 | 9/1991 | Ikeda et al. | 358/80 |
| 5,057,852 | 10/1991 | Formica et al. | 358/75 X |
| 5,087,981 | 2/1992 | Ng et al. | 358/461 |
| 5,134,666 | 7/1992 | Imao et al. | 358/462 X |
| 5,185,661 | 2/1993 | Ng | 358/75 |
| 5,200,831 | 4/1993 | Tai | 358/298 |
| 5,251,023 | 10/1993 | Arimoto et al. | 358/529 |
| 5,315,382 | 5/1994 | Tanioka | 358/462 X |
| 5,331,442 | 7/1994 | Sorimachi | 358/532 |
| 5,341,224 | 8/1994 | Eschbach | 358/456 |

*Primary Examiner*—Peter S. Wong
*Assistant Examiner*—Eric Frahm
*Attorney, Agent, or Firm*—Norman Rushefsky

[57] ABSTRACT

A document reproduction method and apparatus wherein a scanner scans a document to determine the color components of pixels forming the image information on the document. The color signals generated by the scanner are transformed into lightness space and each pixel is examined as part of a window that includes neighboring pixels. The examination involves a first determination of whether or not the neighboring pixels are white pixels, second and third determinations of whether or not the current pixel is a grey pixel and has high contrast, and a fourth determination of whether or not the window has text structure. In accordance with combination of these determinations, a decision is made to recast the pixel as a pixel to be reproduced with a black colorant to thereby minimize color fringing errors at the edge of text-like information.

20 Claims, 3 Drawing Sheets

NOTE: HORIZONTAL DIRECTION
TEXT STRUCTURE

| + | + |   | – | – |
|---|---|---|---|---|
| + | + |   | – | – |
| + | + | × | – | – |
| + | + |   | – | – |
| + | + |   | – | – |

| – | – |   | + | + |
|---|---|---|---|---|
| – | – |   | + | + |
| – | – | × | + | + |
| – | – |   | + | + |
| – | – |   | + | + |

+ : HIGHER GRAY PIXEL VALUE
– : LOWER GRAY PIXEL VALUE

FIG. 3A

NOTE: 45 DEGREE DIRECTION
TEST STRUCTURE

| + | + | + | + |   |
|---|---|---|---|---|
| – |   | + | + | + |
| – | – | × | + | + |
| – | – | – |   | + |
| – | – | – | – |   |

|   | – | – | – | – |
|---|---|---|---|---|
| + |   | – | – | – |
| + | + | × | – | – |
| + | + | + |   | – |
| + | + | + | + |   |

+ : HIGHER GRAY PIXEL VALUE
– : LOWER GRAY PIXEL VALUE

FIG. 3B

NOTE: VERTICAL DIRECTION
TEST STRUCTURE

| + | + | + | + | + |
|---|---|---|---|---|
| + | + | + | + | + |
|   |   | × |   |   |
| – | – | – | – | – |
| – | – | – | – | – |

| – | – | – | – | – |
|---|---|---|---|---|
| – | – | – | – | – |
|   |   | × |   |   |
| + | + | + | + | + |
| + | + | + | + | + |

+ : HIGHER GRAY PIXEL VALUE
– : LOWER GRAY PIXEL VALUE

FIG. 3C

METHOD AND APPARATUS OF COPYING OF BLACK TEXT ON DOCUMENTS USING A COLOR SCANNER

BACKGROUND OF THE INVENTION

1. Field of the Invention

The present invention relates to color image processing methods and apparatus, and more particularly, to a method and apparatus for producing images with high quality.

2. Description Relative to the Prior Art

In electronic color copiers, a document is scanned with a color scanner and electronic signals relating to the detected color of the information scanned is processed and reproduced by a color printer. Where the document is a color document that includes say black text, the black text is likely to have been formed from the combination of plural color toners or inks which together render black. As these colors are not likely to be registered on the original, the reproduction is likely to also suffer because the scanner when scanning the original detects the off-registered different colors rather than "seeing" a pure black text character. Where the background to the text is white, the resulting printed copy of the document is not of high quality appearance since color fringing is apparent in the edges of black text. Even documents that are pure black on white are subject to color scanning errors by the scanner and may be reproduced with text that is fringed with color.

SUMMARY OF THE INVENTION

It is therefore an object of the invention to provide an apparatus and method which overcomes the problems referred to in the prior art. These and other objects and advantages are realized by a reproduction apparatus for copying color information, the apparatus comprising first means for scanning an original to be reproduced and generating signals representing plural color components of pixels of the information scanned; second means for examining a current pixel to determine if the current pixel meets a first criterion of having any neighboring pixels that meet a criterion for a white pixel and if the current pixel meets a second criterion for a gray pixel; and third means for substituting for the current pixel meeting the first and second criteria a signal indicative that the current pixel has only black color content.

The invention is further realized by a method of copying color information, the method comprising the steps of scanning an original to be reproduced and generating signals representing plural color components of pixels of the information scanned; examining a current pixel to determine if the current pixel meets a first criterion of having any neighboring pixels that meet a criterion for a white pixel and if the current pixel meets a second criterion for a gray pixel; and substituting for the current pixel meeting the first and second criteria a signal indicative that the current pixel has only black color content.

The other objects and advantages of the present invention will become apparent from the following description of the embodiments when read in conjunction with the accompanying drawings.

BRIEF DESCRIPTION OF THE DRAWINGS

FIGS. 3A, 3B and 3C represent examples of 5×5 windows of pixels wherein the arrangements of pixels in the windows indicates a text structure in accordance with the method and apparatus of the invention.

DETAILED DESCRIPTION OF THE PREFERRED EMBODIMENTS

Because copier apparatus are well known, the present description will be directed in particular to elements forming part of or cooperating more directly with the present invention. Apparatus not specifically shown or described herein are selectable from those known in the prior art.

Figure 1:
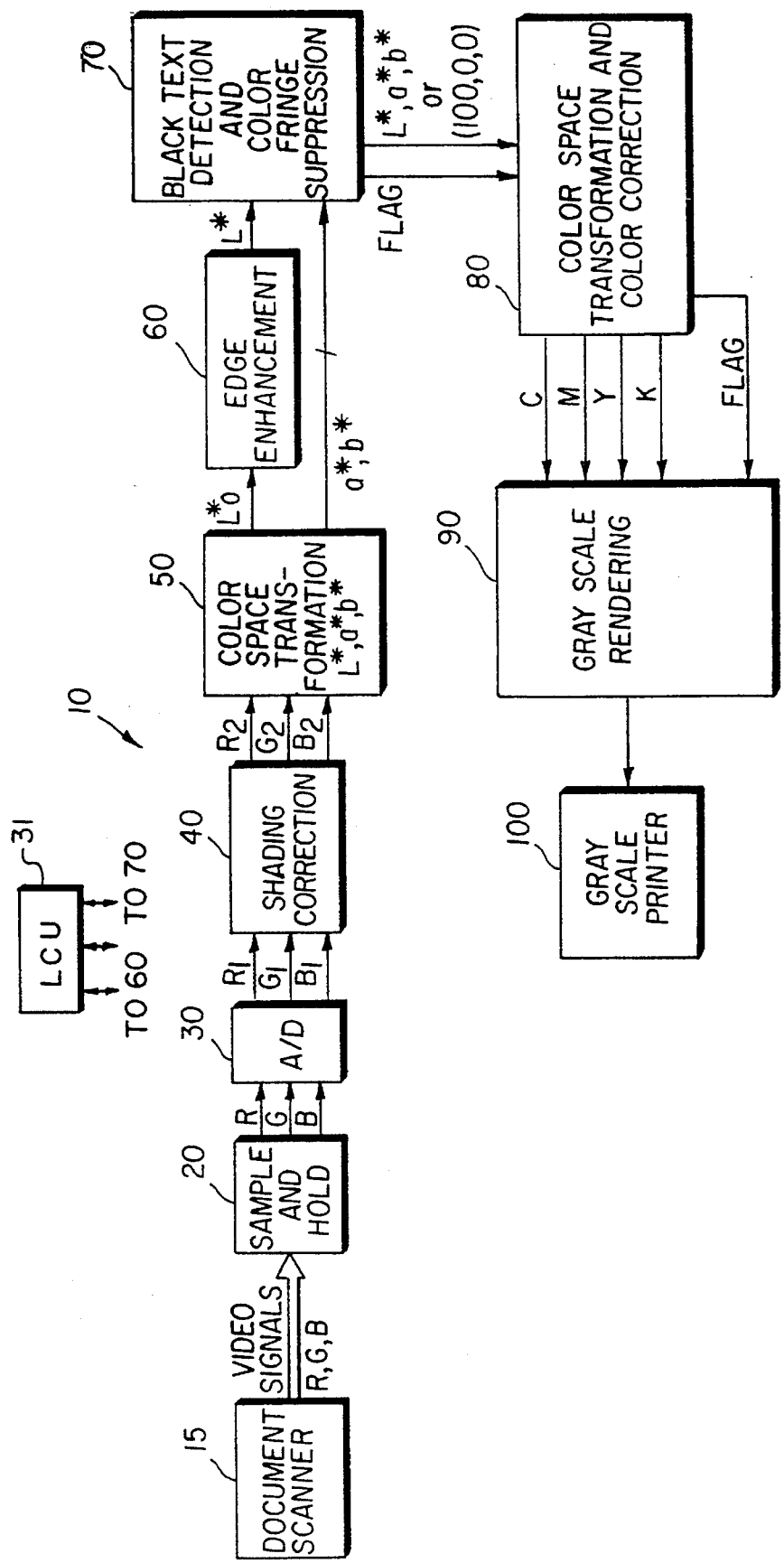
FIG. 1 is a block diagram showing one embodiment of a copier apparatus of the invention.

With reference to FIG. 1, a document copier apparatus 10 includes a scanner 15 that scans an original document. Typically, the document is illuminated with an exposure lamp and a reflected light is read with a color readout sensor such as CCDs for each pixel through color separation. The scanner conventionally outputs video signals representing the red, green and blue color separation signals. Thus, for any scanned picture element (pixel) there are 3 color pixel values associated therewith. The scanned pixel values designated R, G, B are sampled and stored in a sample and hold circuit 20 and then each color signal is converted by an analog to digital converter 30 to a digital signal $R_1$, $G_1$, $B_1$. Each color of the scanned pixel is thus now designated by say an eight-bit signal $R_1$, $G_1$, $B_1$ that together is 24 bits. The values of each color thus vary from 0 to 255. The color signal is now input to a shading correction circuit 40 to correct for inherent errors in the scanner in scanning of different colors. The corrected signals $R_2$, $G_2$, $B_2$ output from the shading correction circuit are input to a color space transformation circuit 50 which may be hardwired look-up tables with calculation for interpolation or may be software processed by a computer such as that provided in logic and control unit 31 which includes a central processor unit that controls the copier.

In the color space transformation the $R_2$, $G_2$, $B_2$ signals for each pixel are converted to a well known lightness space variable such as $L^*$, $u^*$, $v^*$ or $L^*$, $a^*$, $b^*$. In these lightness spaces, equal increments in lightness are equally perceptible. This facilitates some coordination between what the scanner "sees", what the printer "prints" and what a human "sees." In $L^*$, $a^*$, $b^*$ space, luminance $L^*$ will vary from 0 to 100 along the $L^*$ axis but 8-bit accuracy is maintained along the $a^*$, $b^*$ chrominance axes as these values each vary from −127 to 127. In $L^*$, $a^*$, $b^*$ space pixels with higher $L^*$ values are lighter appearing. Pixels with low chrominance values $a^*$, $b^*$ are of lighter color. A pure white has $L^*$ value of 100 and $a^*$, $b^*$ values of 0. A grey pixel has small $a^*$, $b^*$ values close to the origin of the $a^*$, $b^*$ plane.

After transformation into lightness space, the lightness portion of the resulting signal designated herein as $L^*o$ is modified for edge enhancement by either software in the LCU 31 ore by a dedicated circuit 60. The edge enhancement circuit may take the form of a high emphasis filter such as found with unsharp masking circuits or circuits providing finite impulse response (FIR) filtering. The resulting luminance value designated herein as $L^*$ is output by the edge enhancement circuit 60 and is input with the corresponding chrominance values $a^*$, $b^*$ for the respective pixel into a black text detection and color fringe suppression processor 70. This processor too may be software operated entirely within the LCU 31 or a separate dedicated processor or a suitable dedicated ASIC device.

Figure 2:
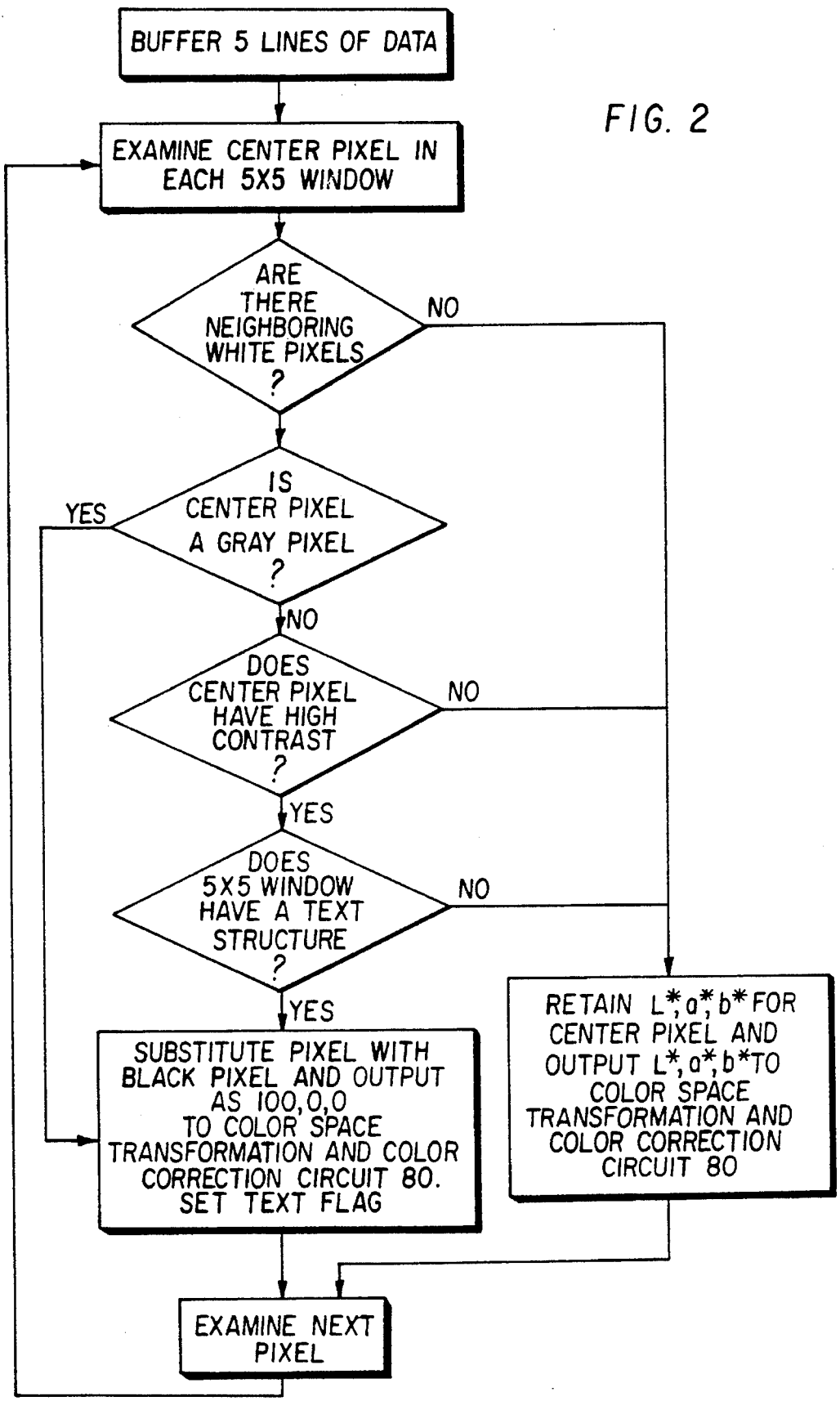
FIG. 2 is a flowchart illustrating operation of a back text detection and color fringe suppression algorithm of the invention.

Reference will now be made to the flowchart of FIG. 2 which describes an algorithm used by processor 70 for operating on each pixel for black text detection. The following description will assume a document is scanned that is on white paper and has black text and wherein the black text printed using 3 colored toners (cyan, magenta, yellow, for example) and where, due to misregistration of the colors, there is color fringing against the white background. The algorithm assumes that white pixels are characterized by $L^*$ values of 90 or more and $a^*$, $b^*$ values of less than 3.0 each (i.e., chrominance distance from the zero origin of the $a^*$, $b^*$ plane). Black pixels in the body of the text will normally have $L^*$ values from 5 to 30 and $a^*$, $b^*$ values each from 0 to 10. The text border or edge pixels have an even wider spread of $L^*$, $a^*$, $b^*$ values. As the current pixel can be associated with text, picture or other types of regions the algorithm of the processor analyzes each pixel with reference to surrounding pixels. To do this, a buffer is provided to buffer 5 complete lines of pixel data with each pixel defined in $L^*$, $a^*$, $b^*$ space. A 5×5 window is then defined to examine the center or current pixel vis-a-vis the 24 neighboring pixels in the window. If there are white neighboring pixels in the window, then further processing of the current pixel by the algorithm is made. If no white neighboring pixels are noted, the current pixel's $L^*$, $a^*$, $b^*$ values are passed unchanged to a color space transformation and Color correction circuit 80. This will exclude further processing of most pixels that are inside of color pictures. If there are "white" neighboring pixels, then the current pixel is examined to determine if it is grey. The criteria for defining "grey" involve an examination of the $a^*$, $b^*$ values of the current pixel and determination as to whether or not they are less than 3.0. If they are, the pixel is defined as grey. If it meets the criteria for grey, the $L^*$, $a^*$, $b^*$ values for the current pixel are changed to that of a single color black pixel ($L^*=100$, $a^*=0$, $b^*=0$). Since this substitution is not made unless there are neighboring white pixels, the processor 70 will maintain unchanged the $L^*$, $a^*$, $b^*$ values for pixels that are in text, but are away from the borders.

For a current pixel that is not grey and has white neighbors, a determination is made as to whether or not this pixel is in a high contrast window. For the pixels in the 5×5 window under investigation the maximum $L^*$ value and the minimum $L^*$ values in the window are determined. The difference between maximum $L^*$ and minimum $L^*$ is defined as local contrast. If local contrast is greater than a predetermined value, say 30, then the window has high local contrast and an edge region is possibly indicated. A window having high local contrast is further examined to see if it has a text structure. A text structure is defined for a 5×5 window where the pixels in the window are consistently of higher $L^*$ value in one side of the window than in the opposite side of the window. There are three directions, vertical, horizontal and 45 degrees (see some examples in FIGS. 3a, 3b, 3c) to be tested. If a test in one of the directions is satisfied with the above text structure definition, then the current pixel has a text structure associated with it. In that case, the current pixel is in a high local contrast region and its value of $L^*$, $a^*$, $b^*$ is replaced by a black pixel ($L^*=100$, $a^*=0$, $b^*=0$). Where the pixel has been identified as having a text structure, a flag accompanying the processed pixel value is set and output with the processed value to the color transformation and color correction processor 80. Processor 80 may comprise a look-up table (LUT) memory that transforms $L^*$, $a^*$, $b^*$ values to C, M, Y, K values (cyan, magenta, yellow, black). This transformation may include provision for undercolor removal where, as is well known, a color pixel having C, M and Y components may be at least partially rendered in black ink or toner.

After transformation to C, M, Y, K color separation space., the color signals for the color pixel are processed by grey scale rendering processor 90. In processor 90, the pixel may be processed in either a screening mode or a non-screening mode in accordance with the text/no-text flag accompanying the color signal. Pixels determined to be black text are not subject to screening and the border of text can thus be rendered in a higher resolution. In this regard, reference may be had to my U.S. application Ser. No. 07/895,555 U.S. Pat. No. 5,200,831, the contents of which are incorporated herein by this reference.

In grey scale rendering processor 90, the pixels are mapped into page buffer memories for the four-color separations C, M, Y, K. The image signals for the pixels of each respective color are output to a grey scale printer 100. The printer 100 may be an LED print bar or laser that exposes an electrostatically charged photoconductive medium such as a web or drum to imagewise modulate the charge on the medium. The modulated charge is then developed and transferred to a receiver sheet. Four image frames each of a different developed color may be exposed and developed with cyan, magenta, yellow and black toners and transferred in register to a receiver sheet as described in U.S. Pat. No. 5,159,357, the contents of which are incorporated herein by this reference. Other types of printers may also be used including electrography, ink jet, etc. The printer may be remote from other positions of the circuitry and connected thereto through telephone lines, etc.

Advantages

An improved copier apparatus and method are provided for identifying black pixels at the border of text type microstructures even though the original scanned document may have some color fringing at such borders. The apparatus facilitates identification of such pixels by examining the signals representing the pixels in lightness space rather than in other color spaces. Pixels identified as being black border text pixels have their respective image signals recast to cause them to be printed with black colorant only and are also flagged so that when printed they are not printed in halftone but are printed with the full resolution of the printer even though the remaining part of the text might be printed in halftone.

The invention has been described in detail with particular reference to preferred embodiments thereof, but it will be understood that variations and modifications can be effected within the spirit and scope of the invention.

I claim:

1. In a reproduction apparatus for copying color information, the apparatus comprising:

first means for scanning an original containing color information to be reproduced and generating signals representing plural color components of pixels of the information scanned;

second means for examining a current pixel to determine if the current pixel meets a first criterion of having any neighboring pixels that meet a criterion for a white pixel;

third means for examining the current pixel to determine if the current pixel meets a second criterion for a gray pixel;

fourth means for testing the current pixel that meets the first criterion but not the second criterion to determine in accordance with a third criterion that the current pixel is in a region of high contrast;

fifth means for substituting for the current pixel meeting the first criterion and the third criterion but not meeting the second criterion a signal indicative that the current pixel has only black color content and means, responsive to said signal, for reproducing said current pixel in black.

2. The apparatus of claim 1 and including means for generating a signal indicative that the current pixel is a text pixel.

3. The apparatus of claim 2 and including means for processing a pixel indicated to be a text pixel differently from a pixel not indicated to be a text pixel.

4. The apparatus of claim 1 and including means for examining the current pixel that meets the third criterion to determine if a group of pixels including the current pixel meets a fourth criterion establishing similarity to a text-like structure.

5. The apparatus of claim 4 and wherein said third means includes means for substituting for the current pixel meeting the first criterion, the third criterion and the fourth criterion but not the second criterion a signal indicative that the current pixel has only black color content.

6. The apparatus of claim 5 and including means for generating a signal indicative that the current pixel is a text pixel.

7. The apparatus of claim 6 and including means for processing a pixel indicated to be a text pixel differently from a pixel not indicated to be a text pixel.

8. The apparatus of claim 1 and wherein said second means examines said current pixel while color of said current pixel is defined in terms of a lightness space representation.

9. The apparatus of claim 4 and wherein said second means examines said current pixel while color of said current pixel is defined in terms of a lightness space representation.

10. The apparatus of claim 5 and wherein said second means examines said current pixel while color of said current pixel is defined in terms of a lightness space representation.

11. A method of copying color information, the method comprising the steps of:

scanning an original containing color information to be reproduced and generating signals representing plural color components of pixels of the information scanned;

examining a current pixel to determine if the current pixel meets a first criterion of having any neighboring pixels that meet a criterion for a white pixel and if the current pixel meets a second criterion for a gray pixel;

testing the current pixel which meets the first criterion but not the second criterion to determine in accordance with a third criterion that the current pixel is in a region of high contrast;

substituting for the current pixel meeting the first criterion and the third criterion but not the second criterion a signal indicative that the current pixel has only black color content; and in response to said signal reproducing the current pixel in black.

12. The method of claim 11 and including the step of generating a signal indicative that the current pixel is a text pixel.

13. The method of claim 12 and including the step of processing a pixel indicated to be a text pixel differently from a pixel not indicated to be a text pixel.

14. The method of claim 11 and including the step of examining the current pixel that meets the third criterion to determine if a group of pixels including the current pixel meets a fourth criterion establishing similarity to a text-like structure.

15. The method of claim 14 and including the step of substituting for the current pixel meeting the first criterion, the third criterion and the fourth criterion but not the second criterion a signal indicative that the current pixel has only black color content.

16. The method of claim 15 and including the step of generating a signal indicative that the current pixel is a text pixel.

17. The method of claim 16 and including the step of processing a pixel indicated to be a text pixel differently from a pixel not indicated to be a text pixel.

18. The method of claim 11 and wherein in the step of examining said current pixel for said first criterion and said second criterion a color of said current pixel is defined in terms of a lightness space representation.

19. The method of claim 14 and wherein in the step of examining said current pixel for said first criterion and said second criterion a color of said current pixel is defined in terms of a lightness space representation.

20. The method of claim 15 and wherein in the step of examining said current pixel for said first criterion and said second criterion color of said current pixel is defined in terms of a lightness space representation.

\* \* \* \* \*